US012527520B2

(12) United States Patent
D'Ambrosio

(10) Patent No.: US 12,527,520 B2
(45) Date of Patent: Jan. 20, 2026

(54) WEARABLE MEDICAL DEVICE OF THE IMPROVED TYPE FOR BIOMETRIC MONITORING AND FIRST HEALTH INTERVENTION AND RELATED PROCEDURE

(71) Applicant: LEVER s.r.l. Start Up Innovativa, Avellino (IT)

(72) Inventor: Mario D'Ambrosio, Avellino (IT)

(73) Assignee: LEVER S. R. L. START UP INNOVATIVA, Avellino (IT)

( * ) Notice: Subject to any disclaimer, the term of this patent is extended or adjusted under 35 U.S.C. 154(b) by 605 days.

(21) Appl. No.: 17/997,849

(22) PCT Filed: Apr. 27, 2021

(86) PCT No.: PCT/EP2021/060894
§ 371 (c)(1),
(2) Date: Nov. 3, 2022

(87) PCT Pub. No.: WO2021/224053
PCT Pub. Date: Nov. 11, 2021

(65) Prior Publication Data
US 2023/0337979 A1    Oct. 26, 2023

(30) Foreign Application Priority Data
May 6, 2020    (IT) ........................ 102020000010099

(51) Int. Cl.
*A61B 5/00*        (2006.01)
*A61B 5/0205*    (2006.01)
(Continued)

(52) U.S. Cl.
CPC ........ *A61B 5/6804* (2013.01); *A61B 5/02055* (2013.01); *A61B 5/02416* (2013.01);
(Continued)

(58) Field of Classification Search
CPC . A61B 5/6804; A61B 5/6805; A61B 5/02405; A61B 5/308; A61B 5/349; A61B 5/352; A61N 1/36507; A61N 1/3625
See application file for complete search history.

(56) References Cited

U.S. PATENT DOCUMENTS 5,995,861 A * 11/1999 Price ...................... A61B 5/282
600/382
2011/0224565 A1* 9/2011 Ong ...................... A61B 5/4824
600/509

(Continued)

FOREIGN PATENT DOCUMENTS

WO         0178577 A2    10/2001
WO    WO-2009103938 A1 *  8/2009 ............. A61B 34/73
(Continued)

OTHER PUBLICATIONS

Attia, Zachi I, et al "An artificial intelligence-enabled ECG algorithm for the identification of patients with atrial fibrillation during sinus rhythm: a retrospective analysis of outcome prediction" The Lancet, vol. 394, Issue 10201, p. 861-867, Aug. 1, 2019 https://www.thelancet.com/journals/lancet/article/PIIS0140-6736(19)31721-0/fulltext.
(Continued)

*Primary Examiner* — Eun Hwa Kim
(74) *Attorney, Agent, or Firm* — Craft Chu PLLC; Andrew Chu

(57) ABSTRACT

The garment suitable for hosting a management and functioning logic and sensors/electrodes positioned in predetermined areas of the human body suitably is stabilized by the innovative characteristics of the garment itself and aimed at visualizing the state of health of the heart muscle. The sensors feature a new type of layout in order to minimize artifacts during vectorcardiogram generation. The entire apparatus communicates in real time with the Internet and
(Continued)

exploits the architectures of Artificial Intelligence in order to improve the predictive performance of any heart disease.

6 Claims, 8 Drawing Sheets

(51) Int. Cl.
| | |
|---|---|
| *A61B 5/024* | (2006.01) |
| *A61B 5/11* | (2006.01) |
| *A61B 5/282* | (2021.01) |
| *A61B 5/308* | (2021.01) |
| *A61B 5/349* | (2021.01) |
| *A61N 1/365* | (2006.01) |

(52) U.S. Cl.
CPC ............ *A61B 5/1112* (2013.01); *A61B 5/308* (2021.01); *A61B 5/349* (2021.01); *A61N 1/36507* (2013.01)

(56) References Cited

U.S. PATENT DOCUMENTS

| | | | |
|---|---|---|---|
| 2014/0070957 A1 | 3/2014 | Longinotti-Buitoni et al. | |
| 2015/0201858 A1* | 7/2015 | Ganim | A61B 5/30 600/393 |
| 2016/0081572 A1* | 3/2016 | Hong | A61B 5/14542 600/301 |
| 2016/0331321 A1* | 11/2016 | O'Keefe | A61B 5/6805 |
| 2019/0209028 A1* | 7/2019 | Baxi | A61B 5/28 |
| 2019/0298987 A1 | 10/2019 | Freeman et al. | |
| 2020/0008299 A1* | 1/2020 | Tran | H05K 1/0386 |
| 2022/0370788 A1* | 11/2022 | Freeman | A61N 1/046 |

FOREIGN PATENT DOCUMENTS

| | | |
|---|---|---|
| WO | 2013093923 A1 | 6/2013 |
| WO | 2016149751 A1 | 9/2016 |
| WO | 2017033058 A1 | 3/2017 |

OTHER PUBLICATIONS

XILINX ACAP, White Paper: Versal ACAP, Jun. 19, 2021 https://www.xilinx.com/content/dam/xilinx/support/documents/white_papers/wp518-ai-edge-intro.pdf.

Khan, G. M. (2015) . A new electrode placement method for obtaining 12 lead ECGs. OpenHeart, 2 (1)https://openheart.bmj.com/content/2/1/e000226.

Nikoleli, Georgia-Paraskevi, et al. "Recent Lipid Membrane-Based Biosensing Platforms" Applied Sciences, vol. 9, No. 9, Apr. 27, 2019, p. 1745, XP055764881, DOI: 10.3390/app9091745, p. 16, II. 4, 17, 18 https://www.mdpi.com/2076-3417/9/9/1745.

Yin, Hongxu et al "A Health Decision Support System for Disease Diagnosis Based on Wearable Medical Sensors and Machine Learning Ensembles" IEEE Transactions on Multi-Scale Computing Systems, IEEE, vol. 3, No. 4, May 31, 2017, pp. 228-241, XP011674511, DOI: 10.1109/TMSCS.2017.2710194, table 1 https://ieeexplore.ieee.org/document/7936635.

\* cited by examiner

Figure 1:
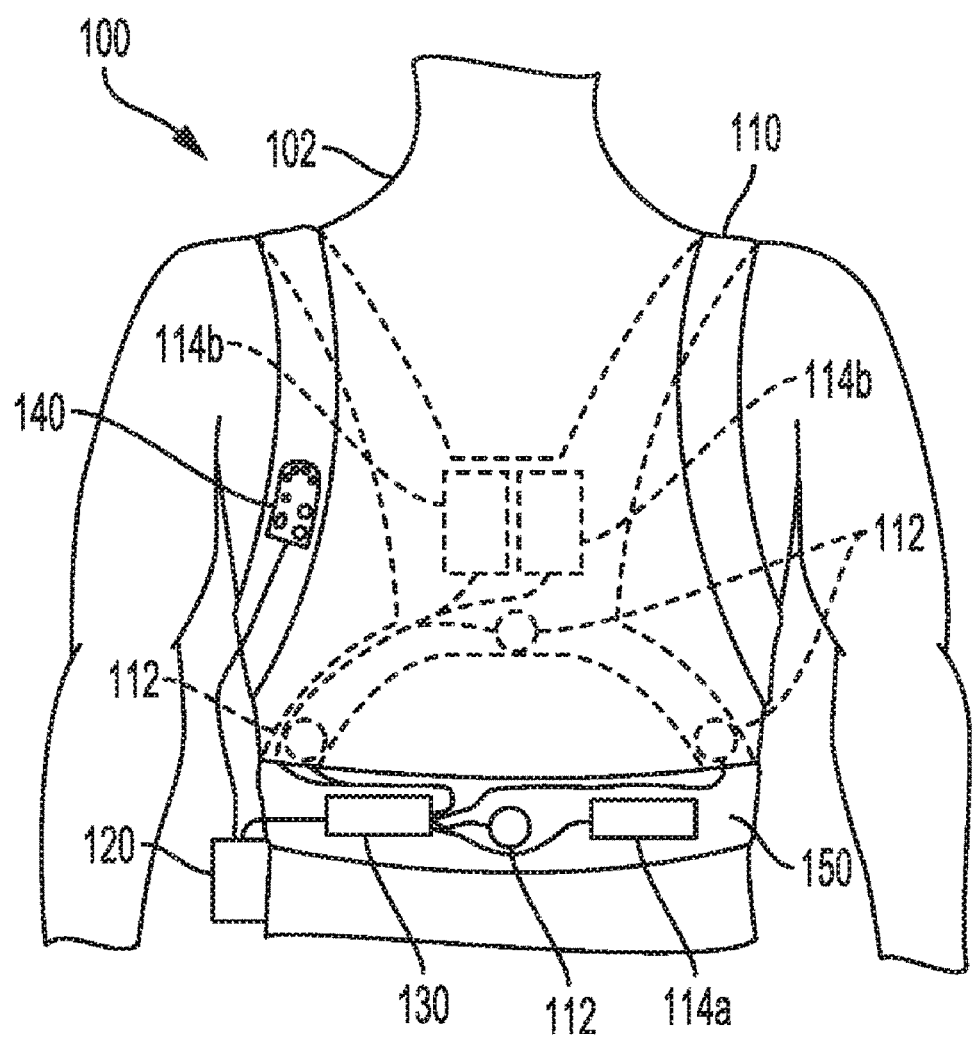

Fig1, Prior Art side view

WEARABLE MEDICAL DEVICE OF THE IMPROVED TYPE FOR BIOMETRIC MONITORING AND FIRST HEALTH INTERVENTION AND RELATED PROCEDURE

BACKGROUND OF THE INVENTION

The device resulting from the idea of the invention takes shape within the category of those electronic medical equipment strongly integrated into clothing in contact with the skin.

These solutions are able to collect useful and essential parameters for medical/health purposes and make them available in real-time for the prevention and administration, first aid, of strategies aimed at improving the state of health of patients, up to also to avoid death.

The embodiment of this invention has as its operative target the functionalities of the heart muscle and all the pathologies attributable to it, for this reason the solutions disclosed therein are fed by the knowledge acquired up to now in this field of application.

State of Art

Cardiovascular diseases represent the first cause of death in the population of Western countries and specifically in Europe, they represent the first cause of death in the population; according to the WHO it is estimated that mortality from cardiovascular diseases is about half of total mortality in Europe and causes 4.35 million deaths every year in the 52 member states that make up the European Region. These diseases are also the main cause of disability and reduced quality of life.

Among these, ischemic heart disease is one of the most aggressive forms of degeneration of the cardiovascular system.

Cardiac ischemias, commonly called coronary heart disease, are characterized by a difficulty in supplying oxygen to the heart muscle. In conditions of stress or exertion, the heart's activity largely depends on the ability of the coronary arteries to widen their lumen, providing the myocardium with a supply of blood and therefore additional oxygen.

The gradualness that characterizes the occlusion process of the coronary arteries due to cardiac ischemias also determines a certain variability in the symptoms of the resulting diseases. The most frequent, obvious and serious manifestations of cardiac ischemia are angina pectoris and heart attack.

Currently to treat these pathologies the formulas used are hospitalization which allows to normalize the balance by satisfying the oxygen demand of the myocardium. In addition, specific medicines are administered such as anti-angina, nitro derivatives, beta-blockers and to a lesser extent calcium channel blockers.

For the more acute and aggressive forms, on the other hand, the treatment consists in reopening the stenotic vessels through coronary angioplasty and/or coronary stent.

These treatments have a heavy impact on the patient's life, forcing him to stay in hospital for long periods or to undergo invasive surgery. All in conditions of discomfort caused by the overcrowding that often afflicts the cardiological departments of hospitals. There is also a lack of tools that allow both direct communication between doctors and patients, and to easily check in real-time the cardiac health status of their patients.

As regards the monitoring of cardiovascular activity, many large groups such as Amazon, Garmin, Apple, Google and the large digital giants in general, are developing wearable devices capable of measuring blood pressure, heart rate, sports performance, the number of steps performed in a day and also the body mass.

Apple, for example, has integrated sensors into the smartwatch that are useful for monitoring heart activity; specifically, these devices are equipped with a heart rate monitor. A pressure gauge in the smartwatch device is also being perfected.

It appears to be already available on the market a chest strap that allows to measure the pressure through a wireless communication; this range is in communication with an App (Software Application) through which to store and manage the measurements. Italia Srl of Milan produces the "X10X", "X10Y" device or a wearable medical device that operates an ECG on 12 leads, however it is not designed with a view to practicality unless there are obvious disadvantages and limitations during its use.

Apple has inserted the ECG, or more precisely the PPG detection system revealed below, on the Apple Watch 4.

These just described are just some examples of devices already available on the market which demonstrate how e-health is rapidly evolving into commonly used wearable devices.

As can be understood from the examples reported, the devices available on the market are oriented to the monitoring of cardiac functions but not to the advanced monitoring and treatment of any pathologies that may possibly arise.

Another determining factor for having a picture of digital medicine is electroceutics, a new medical discipline based on electrical stimulation that has evolved rapidly thanks to digital technology. Specifically, electroceutics covers the entire field bioelectronic medicine in which electrical of stimulation is used to influence and modify the functions of the human body.

Electrocutaneous appliances, for example, use electrical signals to stimulate the nerve cells of specific tissues and organs to develop, improve and regenerate performance.

As regards the monitoring of cardiac activity, finally, there are two new detection methods: HRV (High Rate Variability) and PPG (Photoplethysmografy). Both methods use light to determine blood pressure through the photonic isolation of a vein. The difference between the two is linked to the fact that HRV relates blood pressure to the autonomic nervous system by offering a stress test, while PPG only collects blood data directly related to cardiac activity.

In the field of research into intelligent biomedical materials, researchers from the ARC Center of Excellence for Electro-Materials Science (ACES) collaborated with researchers from the University of Texas at Dallas to develop a 3D-based "Sutrode" of graphene. Sutrode is an amalgam of electrode and suture because the device simulates the electrical properties of the former and the mechanical properties of the latter. The strength and flexibility of the Sutrode allow the device to be tied around incredibly small bundles of nerves which then record and detect neuronal activity, providing more effective communication from these individual nerve areas; However, Sutrode remains a subcutaneous device based on the electrical stimulation principles of electroceutics.

Most electroceutical research has been limited to traditional materials which are not fully compatible with the soft tissues they intend to interact with, limiting their electrical communication with the nerves.

Specifically, the electroceutical devices linked to the heart, with the characteristics of monitoring, prevention and treatment of cardiovascular diseases, are not yet sufficiently developed.

Finally, let's take for example the US license US2019298987A1 which reveals a wearable device [FIG. 1, Prior Art US2019298987A1] equipped with sensors and electrodes for the discernment of heart problems and the administration of electric shocks in order to avoid the death of the heart patient.

This license, while revealing an apparatus similar to that of the idea of the invention, does not claim any type of improved solution in close relation to the problems of all "wearable" devices in which the positioning and sensitivity of sensors and electrodes can be impaired and inefficient due to the movements that the patient's body normally generates during walking or other normal daytime activities.

In addition, the State of the Art solutions designed to change the position of these sensors and/or electrodes are always linked to a manual intervention by an operator.

SUMMARY OF THE INVENTION

The invention reveals an improved garment designed to house sensors and electrodes positioned in pre-established areas of the human body suitably stabilized by the innovative characteristics of the garment itself. A system equipped with logic allows the management, reprocessing and bidirectional transmission of data in wireless and/or wired mode to the network, from which computational resources and procedures for sharing and additional data reprocessing are accessible, even in real-time, in turn managed by the institutions and employees of the medical health sector.

The purpose of the invention is to create a 12-lead ECG, also of the Holter type, which is not based solely on the "HRV" detection method (see chapter "STATE OF THE ART") and which can provide data to view remote a spectrometry of the heart functioning in real time, that is a vectorcardiogram.

Furthermore, the device can operate as an intermediary and in relative autonomy for the administration of therapeutic electrical impulses, even of a vital type for the survival of the patient as it is equipped locally, or when the Network connection is absent, with technological functions typical of AI applications. These applications can predict critical operating situations of the heart muscle and trigger emergency therapeutic processes in real-time.

According to the idea of the invention on the garment there is one or more rechargeable batteries also by inductive coupling and/or generation of electricity from the movement of the limbs.

According to the idea of the invention, the sensors and electrodes are equipped with an innovative lay-out capable of improving the state of the art for the purpose of determining and accuracy of the signals in transit to and from the epidermis, and equipped with an optimal geometry for positioning on the human body.

According to the idea of the invention, a solution is also devised to improve the quality of the transmission and reception of electrical signals in the human body.

DESCRIPTION OF THE INVENTION

The table of drawings is integrated into the documentation of this application in order to exemplify the characteristics of the invention, also highlighting variants in the application described therein, in this case:

FIG. 1 reveals the Prior Art of the US2019298987A1 application.

Figure 2:
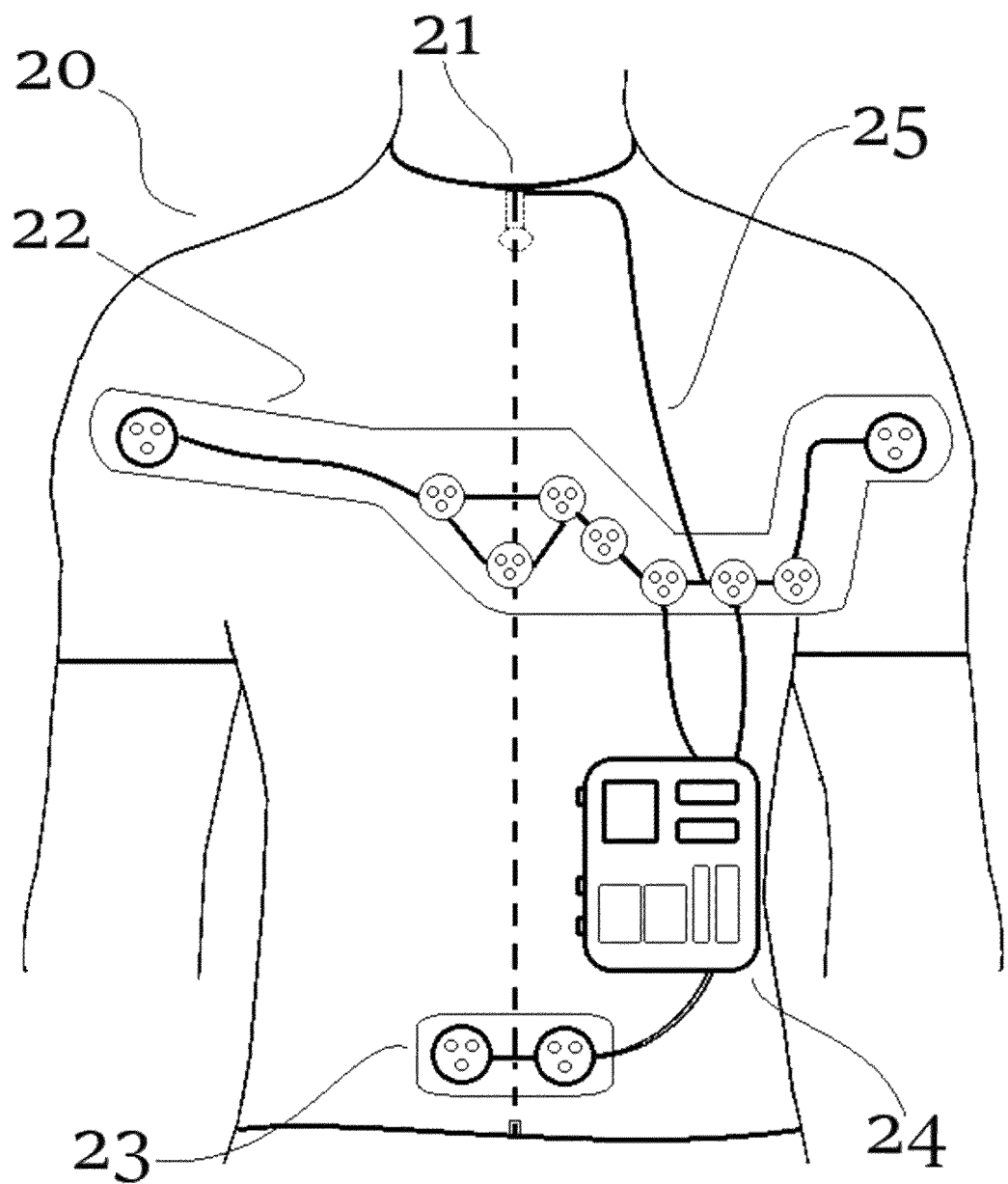

FIG. 2 reveals an overall view of the garment according to the idea of the invention.

Figure 3:
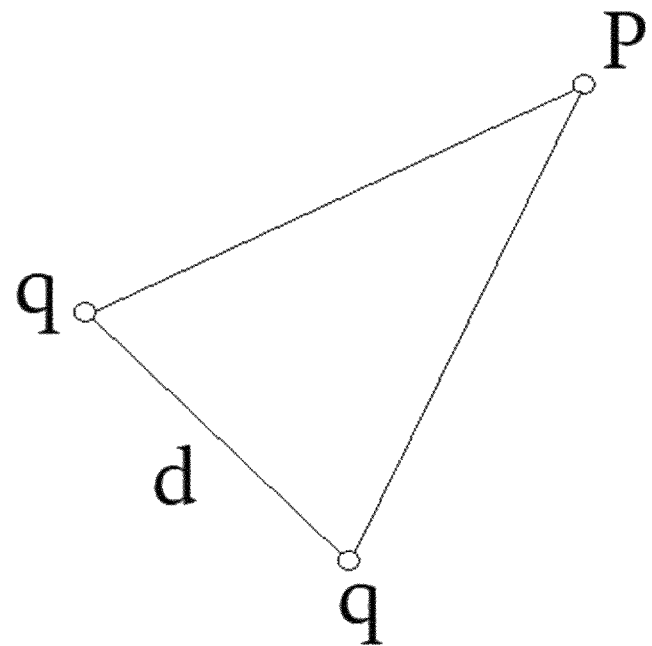

FIG. 3 discloses the relationship for determining the position of a generic sensor on the human body.

Figure 4:
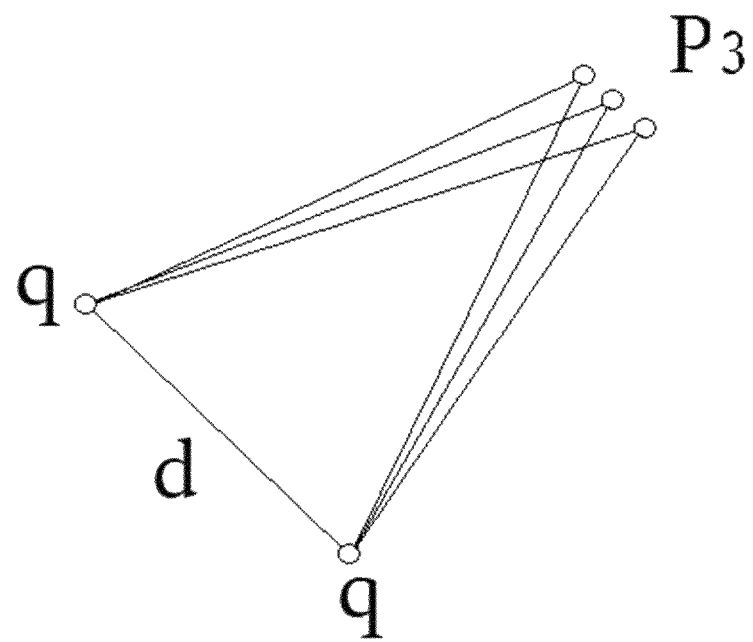

FIG. 4 reveals the relationship according to the idea of the invention for determining the position of the variable geometry sensor/electrode group on the human body.

Figure 5:
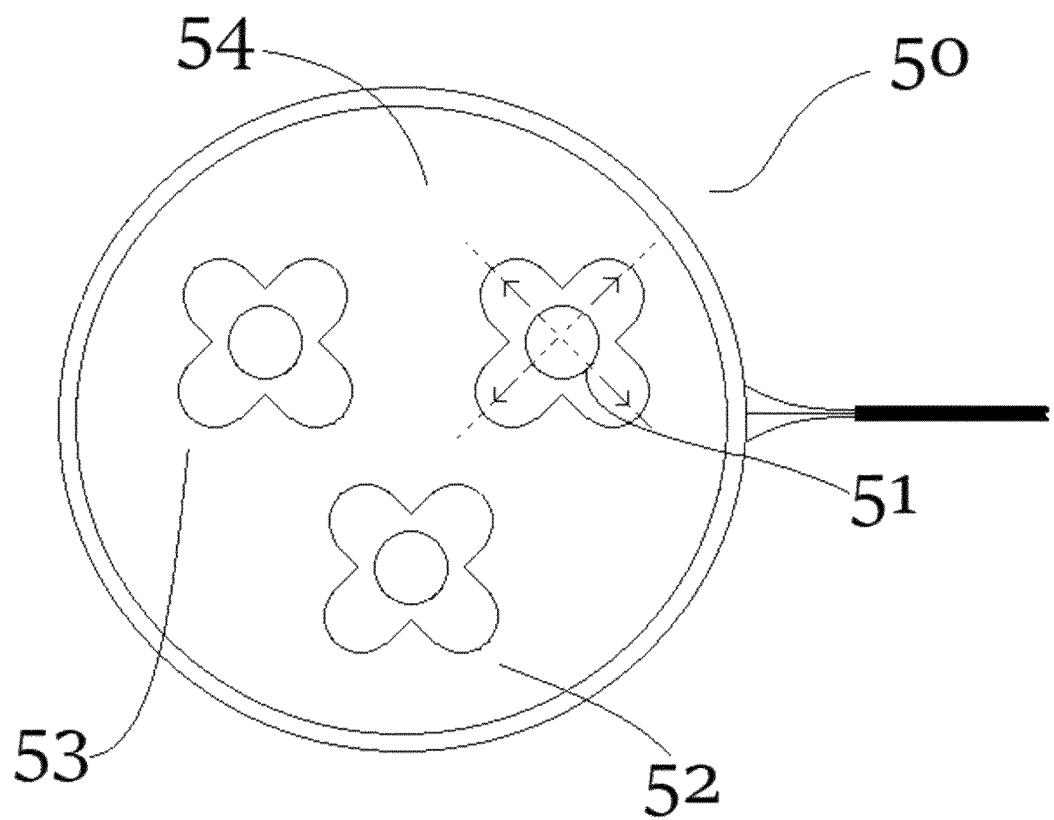

FIG. 5 reveals an embodiment of a variable geometry sensor/electrode group according to the idea of the invention.

Figure 6:
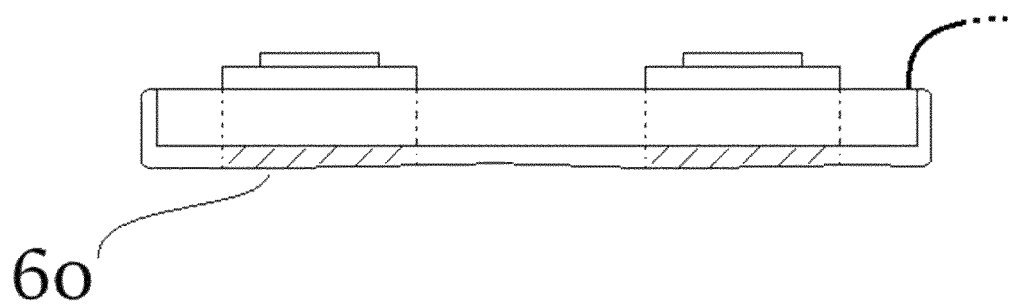

FIG. 6 shows a variable geometry sensor/electrode group according to the idea of the invention in which there is an Artificial Lipid Membrane.

Figure 7:
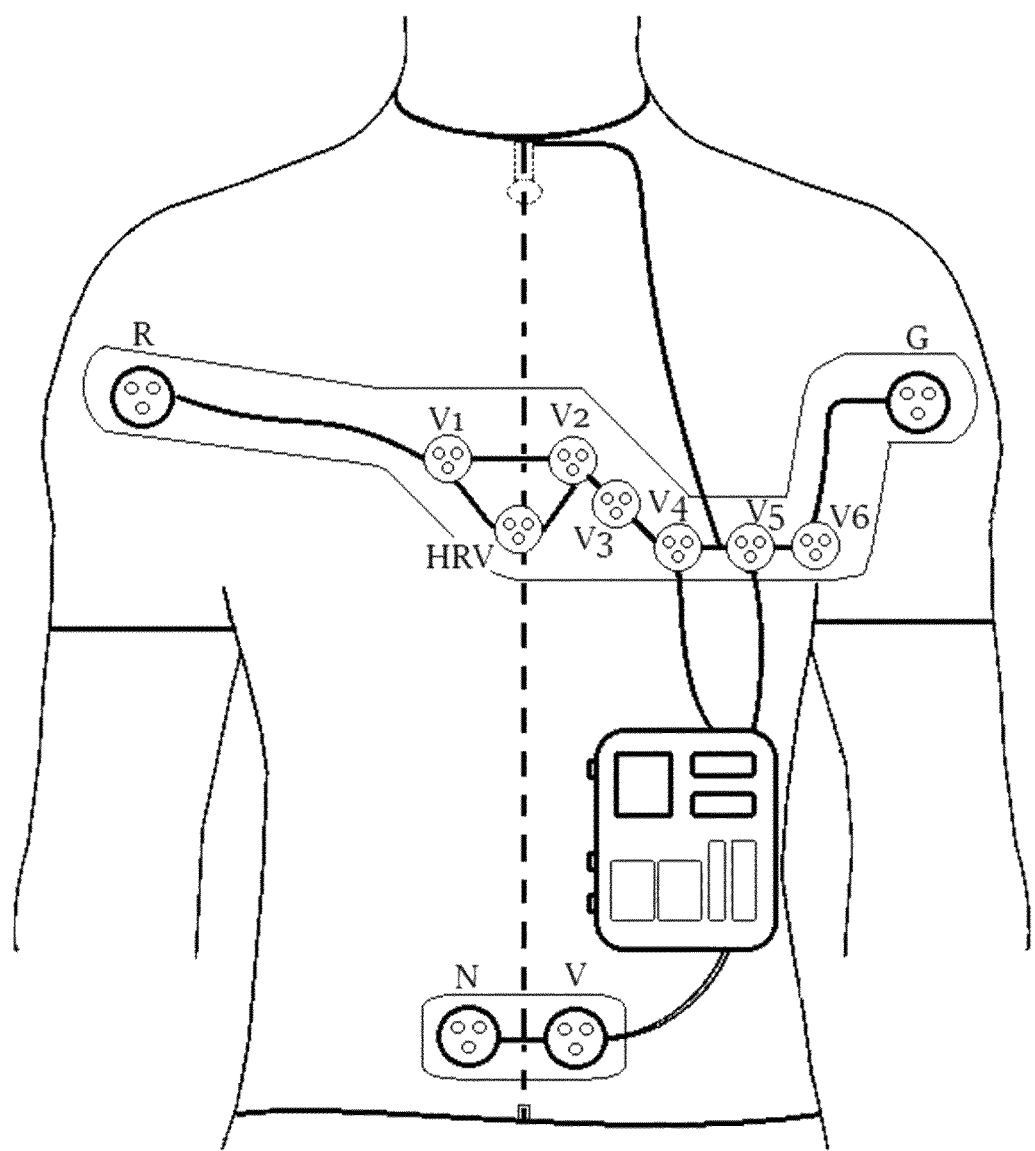

FIG. 7 reveals the typical layout of the variable geometry sensor/electrode groups on the garment according to the idea of the invention.

Figure 8:
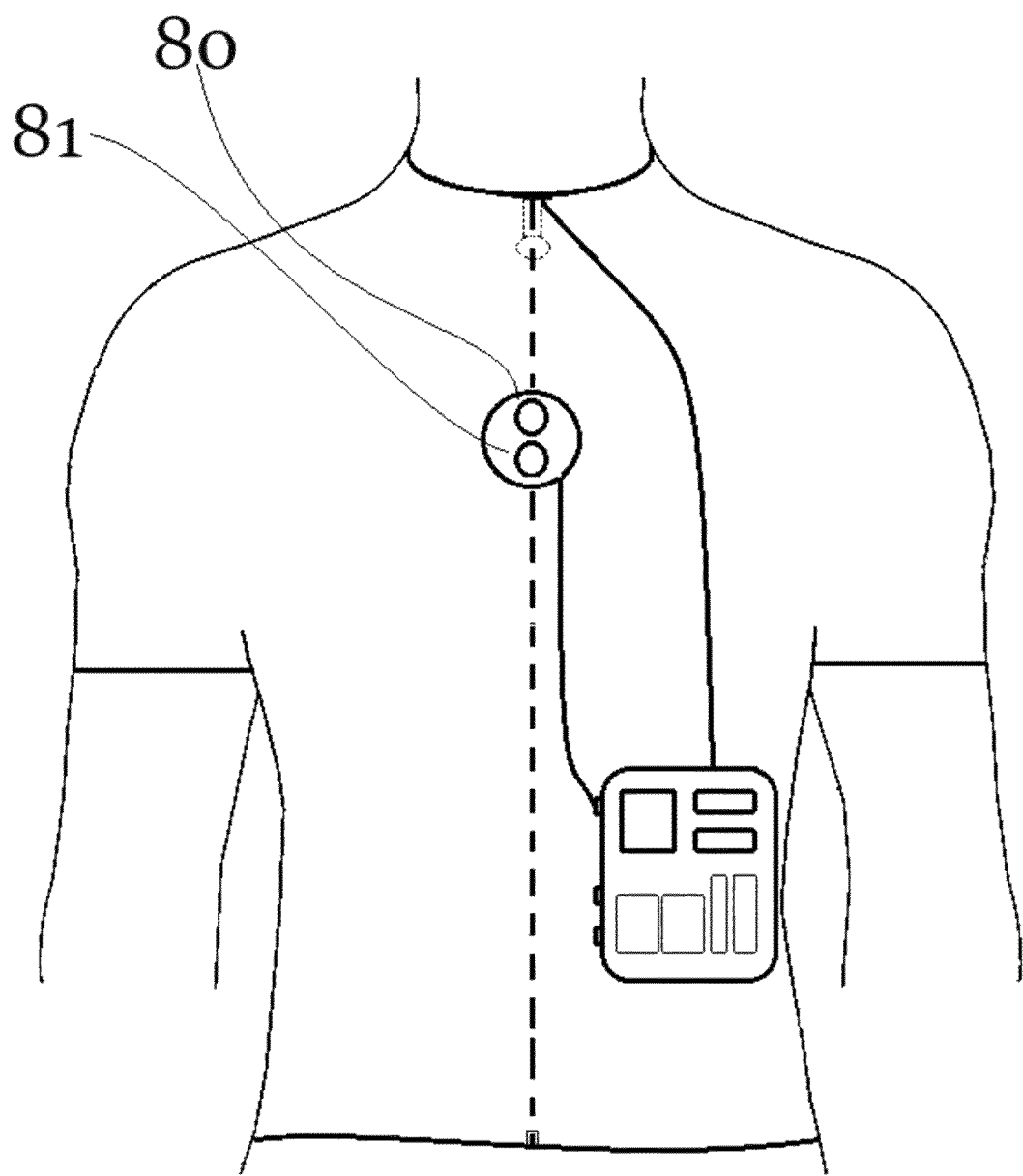

FIG. 8 reveals the use according to the idea of the invention of a photonic sensor.

Figure 9:
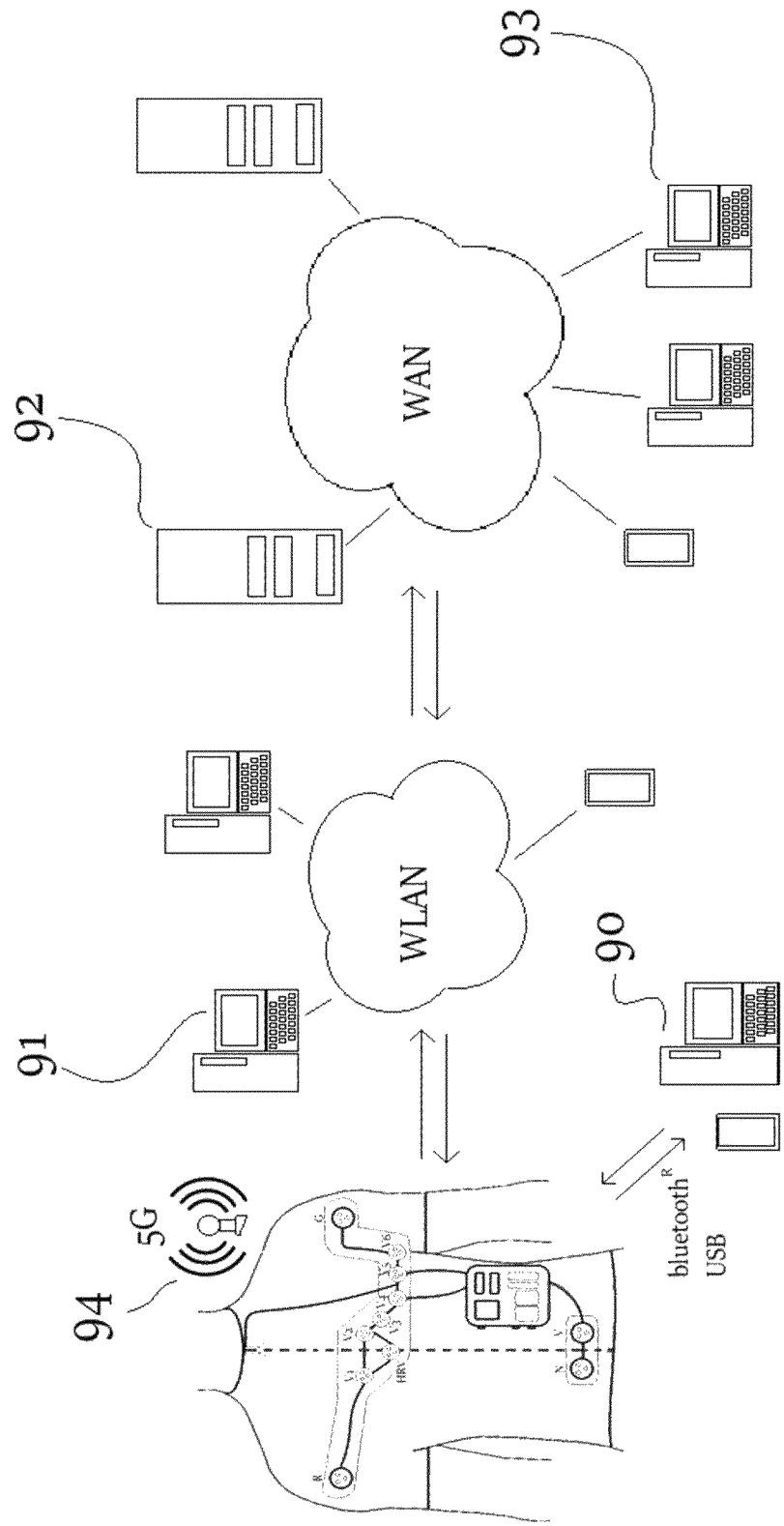

FIG. 9 reveals a typical network connection of the device resulting from the idea of the invention.

Figure 10:
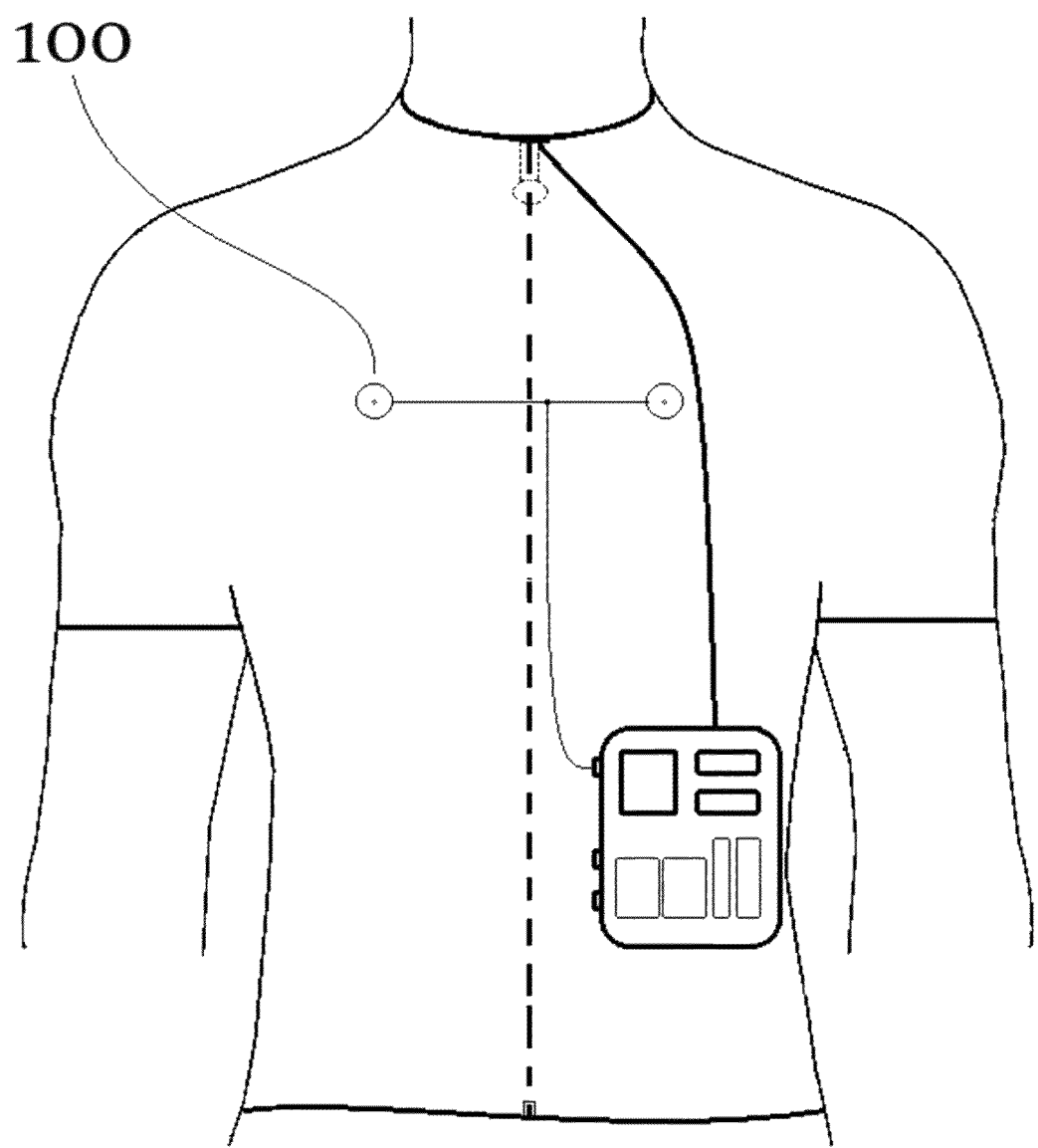

FIG. 10 reveals the management of an audio recording system integrated into the device resulting from the idea of the invention.

The physical parameters of this Description conform to the International System of Units (S.I.)

According to the embodiment of the invention, the garment takes the form of a mesh [FIG. 2 (20)] and consists of a range of polymaterial materials, of natural and/or synthetic type, with high breathability. The coverage area of this garment extends from the base of the neck to the groin, leaving the arms uncovered from the height of the bicep towards the hand.

For the purpose of improving wearability in the rear area of the back there is a zip [FIG. 2 (21)] for the entire length of the garment; in addition, the zip also contains an electrical connection to the control logic of the invention, designed to indicate the correct dressing of the same.

According to the embodiment of the invention there are stiffeners in the areas intended to house the sensors and electrodes [FIG. 2 (22) (23)]; these stiffening areas are mutually connected to each other, while ensuring the necessary flexibility to ensure the general softness of the garment. Moreover, in the areas of connection with the sensors and electrodes, the fabric of the device is equipped with an opening to allow the contact of the sensor and the electrode to the epidermis of the human body.

These stiffeners made by depositing and/or layering of synthetic material, for example of the plastic type, allow a stable reciprocal positioning between the sensors and the electrodes: for example a sensor "A" will always have a stable mutual distance from a sensor "B" and so on. Furthermore, the sensors and electrodes can be conveniently disconnected connected to the wearable device by means of a practical mechanical coupling and an electrical connector.

According to the embodiment of the invention, the garment has specific housings in which it is possible to insert the circuits relating to the management logic, re-processing and data transmission [FIG. 2 (24)]. Furthermore, these housings integrate one or more rechargeable batteries. Thin cables branch out from the control logic to the sensors and electrodes.

In another embodiment of the present invention the electrical connections between sensors and electrodes towards the control logic [FIG. 2 (25)] can also be made by depositing conductive material in the weft of the garment, so that each electrical cable is integrated into the garment itself, thus obtaining greater integration of the entire device.

According to the embodiment of the invention, the electrodes and sensors are equipped with an improvement with respect to the state of the art particularly aimed at the specific field of application, i.e. a "wearable" device. It is well known that one of the greatest difficulties in integrating sensors into clothing derives from the possibility that during the daytime the movement of walking or other physical activity, can modify the aforementioned devices from the optimal position and make reading and/or inaccurate reading. or the administration of electrical signals to the human body.

The scientific literature indicates the following relationship as a useful pivotal point for the analysis of the electrical activity of the heart:

$$P=qd$$

where P is the electric moment and therefore the position of the electrode, q represents two equal charges but of opposite sign and d instead the displacement vector from positive and negative. On the basis of this statement, [FIG. 3] illustrates the physical relationship in determining the position of the electrode on the human body. Since the distance between cells and the extra-cellular environment is always the same, the modulus of the dipolar model depends only on the charge q (therefore on the depolarization/systemic phase; repolarization/diastolic phase) or d=0.

According to the idea of the invention, the displacement of the point P due to the specific field of application of the device can be compensated by integrating in a sensor/electrode body [FIG. 5 (50)] a plurality of sensors/electrodes [FIG. 5 (51) (52) (53)] such as to generate an alternation of intervention, managed by the control logic, in order to intercept which of the sensors/electrodes can guarantee the best transduction of signals to the heart; in this way, the entire process is functional to avoiding the loss of the pivotal point P. According to the idea of the invention, therefore, the point P assumes the P3 value as shown in [FIG. 4].

According to the embodiment of the invention, each sensor/electrode group resulting from the idea is constituted by a plurality of sensors/electrodes, furthermore each sensor/electrode group is equipped with a support towards the substrate that houses it such as to be able to be modified the relative distance of each of them with respect to the others [FIG. 5 (54)] defined as "variable geometry". This solution integrates a slide control mechanically operated by the operator during the installation phase, or other comparable mechanical control.

Once the sensor/electrode assembly has been installed, the plurality of individual sensors/electrodes arranged inside it is monitored during the transit of electrical in order to signals individually enable those sensors and electrodes that produce a smaller amount of artifacts in the vectocardiogram, thus generating an electrical signal with greater dynamic range and a better signal-to-noise ratio. This task is entrusted to the management logic of the device resulting from the idea of the invention, logic resident in the appropriate preparation of the garment. It is possible to create a sensor/electrode group, for example, with only three sensors inside for monitoring the electrical heart signals, or to create a sensor/electrode group in which there are two electrical monitoring sensors and an electrode for perfusion. electric shock and so on.

In another embodiment of the present invention it is also possible to introduce a further refinement to the sensor/electrode assembly with variable geometry through the use of Artificial Lipid Membranes. Artificial Lipid Membranes represent a solution for the study of the surface chemistry of the cells of the human body. The application of these elements allows to establish an adequate interface with the cellular world, also from the point of view of accuracy in the detection of electrical signals of the body for biometric purposes and/or the perfusion of electrical discharges for therapeutic purposes. What is created is a better impedance adaptation and a better function of transfer of electrical signals to and from the cells when established and driven by external diagnostic and therapeutic systems.

According to the idea of the invention, therefore, the electrodes and sensors of the device can be made inside the aforementioned Artificial Lipid Membrane [FIG. 6 (60)].

As already pointed out, this improved characteristic of interfacing with the cells of the human body is constituted both in the detection of electrical signals and in the perfusion of electrical signals towards the cells.

The type of sensors that can be inserted into the variable geometry sensor/electrode group is listed below:

Photonic sensors: the oxidized silicon present in the aforementioned instruments makes it possible to obtain three-dimensional images through the refraction of light into quantifiable noise in the visual perspective. Therefore, the photonic sensors will have the function of scanning the patient's heart. Using a special management software, a three-dimensional image will be created that will show the activity of the heart organ on the devices connected to their own doctors or the reference hospitals.

Electrical Sensors and Electrodes: These transducers are both active and passive. The former will have the function of stimulating the atrial sinus or other areas of the heart muscle; the latter will detect arrhythmias in general of the cardio-circulatory system. For example, electro-stimulators (active transducers) calibrated on the electrical discharge of the heart will have the function of stimulating and maintaining the right electricity of the heart (1.4 Hz) and keeping the cellular tissue on −60 mV and −70 mV; the electrodes (passive transducers) will reveal the rhythm variations of the organ and will determine its action potential.

Infrared sensors (PIR): their function will be to detect the changes in heat produced by the activity of the heart muscle. In this way it will be possible to reconstruct the movements of the heart and recognize any rhythmic and structural anomalies. In addition, by means of the software management system, they will also have the task of checking the correct aiming of the other sensors, in order to improve their synchronization and therefore their effectiveness and calibration. Furthermore, the heat reading performed by the PIRs will allow to visualize a thermal prospect of the heart.

Thermo-sensors: these are thermistors composed of doped silicon semiconductors designed to ensure greater sensitivity and greater proximity. Their presence improves the ability to analyze the temperature of the heart.

Chemical sensors, biosensors: the former, through their linearity processes, will have the function of monitoring the bio-chemical levels of the heart; the biosensors will allow flow control of blood in various daily conditions. The fusion of the two processes described is functional to ensure long-term stability (ie to avoid a drift effect) of the transducers.

According to the embodiment of the invention, the supervision logic circuit [FIG. 2 (24)] consists of an architecture with one or more microprocessors (CPUs) supported by a computational block platform oriented to accelerate the typical features of AI solutions (Deep Learning Machine Learning, Neural platforms widely available on the Network etc.) market (example XILINX ACAP, White Paper: Versal ACAP) which integrate DSPs, FPGAS, CPLDs etc. in an appropriate form.

The circuit includes a Power Management section for the conversion into power of the energy stored in appropriate batteries housed in special arrangements of the invention.

According to the embodiment of the invention, the battery charging circuit, under strict supervision of the control logic, is also designed for the inductively coupled charging mode and/or by converting kinetic energy into electrical energy, techniques known in the state of the art.

According to the embodiment of the invention there are some wired bidirectional connection ports (for example USB) and a communication interface at Level 1 of the OSI Stack of the wireless-LAN and/or Bluetooth® type and 3G infrastructure connections and/or 4G and/or 5G, such as to always guarantee a network connection regardless of the places in which the patient, who wears the invention resulting from the idea of the invention, comes to be. Encrypted communication algorithms are therefore incorporated such as to guarantee perfect security during the exchange of data and operating settings of the invention.

According to the embodiment of the invention there is therefore a bidirectional electrical interface wired to the sensor/electrode groups equipped with the appropriate signal transceivers and one or more/analog digital bidirectional communication interfaces, also of the balanced type.

According to the embodiment of the invention, the supervision logic circuit comprises one or more GPS sensors, one or more magnetometers and one or more accelerometers suitable for determining the positioning parameters in space and the forces acting on the invention resulting from the idea of the invention.

According to the embodiment of the invention there is therefore a housing for an extractable physical memory, which can be used as a backup or other function in the case of wireless transmission and reception of the operating state of the invention were not working.

According to the embodiment of the invention, the architecture of the control logic also allows local management of the data detected by the sensors for the purpose of determining the operating status of the patient's heart muscle. A first "core" of this data processing system is therefore resident in the invention resulting from the idea of the invention and can operate autonomously even when not connected to the Network. This basic level of operation and this architecture is updated when the connection is Network is available and the servers dedicated to the control of the procedures of the invention can cooperate in synergy with the invention.

According to the embodiment of the invention, this basic functionality is necessary if the invention is not connected to the Network; in this case the essential functions must guarantee the patient a basic monitoring and intervention support.

According to the embodiment of the invention at the Network level there are servers in which a further logical level of data processing resides, also operating in the AI canons, through an organization in Cloud or other infrastructure which has more computational resources and operates on the data extrapolated from the invention. Machine Learning platforms such as Deep Learning, Neural Network, Support Vector Machines etc. will be available. Neural Networks, for example, are very promising for approximating and modeling physiological models of organs of the human body after appropriate training through appropriate data sets. For the certification of events, Block-Chain protocols already known to the state of the art are also used.

This infrastructure communicates, elaborates and updates every single wearable device resulting from the idea of the invention and allows authorized health personnel to view the patient's state of health; in case of need it establishes therapeutic processes, even of an emergency type, when not carried out directly under the direct supervision of a qualified doctor.

According to one of the embodiments of the invention, the typical layout of the positioning of the groups of sensors/electrodes with variable geometry on the garment is that visible in [FIG. 7]. This configuration creates a dynamic ECG system with Lead and HRV system.

The groups of sensors/electrodes with variable geometry are arranged in line with the standards of an ECG based on the model of the study and publications attributable to Dr. Khan G. M. (see chapter "REFERENCE DOCUMENTS"). This arrangement has generated a solution to prevent all the alterations due to the positioning of the electrodes in the torso while at the same time managing to acquire a new way of positioning the electrodes functional to an ECG as free of artifacts as possible, achieving the objectives of:
 find a positioning that does not increase the amplitude of the R wave/right axial deviation,
 do not place the electrodes in the acromial process and in the chest because they invalidate Einthoven's theory,
 leave the electrodes R and G positioned anywhere on the arm below the shoulder joint,
 significantly decrease artifacts.

This positioning avoids a change in the amplitude of the R wave which causes the disappearance of the detection of lower infarcts, the appearance of QS complexes in I and aVL and right axial deviation. The study revealed that the positioning achieved the set objectives. The electrodes R and G [FIG. 7] can be placed in the center of the arm, immediately below V4. The electrodes of the legs N and V can be positioned on the abdomen a approximately 8 cm below the horizontal line of the navel and 5 cm per side from the vertical umbilical line. The distance between these two electrodes is 10 cm.

According to the embodiment of the present invention, each sensor/electrode assembly with variable geometry is provided internally with a such transduction elements; for multiplicity of example in [FIG. 5] each group encloses three electrical sensors, or it can contain three perfusion electrodes. This specific layout of the idea of the invention leads to a total of 30 individual sensor/electrode elements (because there are 10 in the traditional non-dynamic ECG) of which 18 are precordial, between the sternal edge of the fourth 10 right intercostal space and the left middle axilla, and 12 peripheral, 6 on the lower abdomen and 6 on the forearm.

According to a further embodiment of the present invention it is optionally possible to add an HRV detection system [FIG. 7] functional to the correlation of the heartbeat with the autonomic nervous system (sympathetic and parasympathetic) in order to have a stress test useful for understand the states of tension that can affect the health status of a heart patient.

According to a further embodiment of the present invention it is possible to insert one or more photonic sensors to the management logic of the invention [FIG. 8]. The photonic sensors consist of a light transmitter [FIG. 8 (80)] and a light receiver [FIG. 8 (81)] and have the function of scanning the patient's heart.

By means of management and analysis software resident on the control logic of the invention and in the one residing in the servers connected to the network, a three-dimensional image is created that shows the activity of the heart organ. This virtual image can be managed for the purpose of monitoring and predictive analysis thanks to the AI systems integrated locally and on the network; furthermore, this image can be displayed on the devices connected to the qualified doctors or hospital structures of reference.

A further demonstration of the functionality of the invention resulting from the idea of the invention is that of the predictive functions when applied to the analysis of electrolyte alterations, specifically hyperkalemia, which is determined by the increase in the amplitude of the T waves (pointed). Each of these individual phenomena recognizable thanks to the 12-lead dynamic ECG set up in the device resulting from the idea of the invention, allows the development of functional algorithms capable of predict the onset of the aforementioned pathologies. An example of such applications is already available in scientific literature (Zachi I Attia Et al, Volume 394, Issuv 10201, P861-867, Published Aug. 1, 2019 on The Lancet).

FIG. 9 reveals the finding resulting from the idea of the invention in close relationship with the network infrastructures and platforms that allow the use of services and procedures relating to heart activity monitoring. Peer to Peer connections with the invention are possible via USB or wireless interfaces such as Bluetooth® also for code download and upload [FIG. 9 (90)]. The system communicates via 3G and/or 4G and/or 5G network protocols [FIG. 9 (94)] and via WLAN interface. Within a local network infrastructure, users and data processing servers are connected to each other [FIG. 9 (91)] for example in a hospital, while in the WAN network as many configurations are possible, including Cloud type, where systems of additional data processing interact together with other users [FIG. 9 (93)] (hospitals, research centers etc.)

A further embodiment of the invention resulting from the idea of the invention allows the use of one or more audio microphones managed by the control logic [FIG. 10 (100)] in order to both implement voice command functions (for example in certain states of health emergency) and to use the audio tracks stored locally and sent to the network on the infrastructure, for a further analysis of phenomena that may fall within the area of competence and intervention of the same apparatus fruit of the idea of the invention.

An example of a general and overall type of the procedure that can be used by means of the invention resulting from the idea of the invention is now provided: this operating procedure is modulated on an intervention of monitoring and perfusion of electrical stimuli in order to manage the onset of a myocardial infarction. The overall example embodies other functions of a more simplified nature, such as, for example, only the monitoring of cardiac activity.

These simplified functions can obviously be put into practice exclusively, depending on the needs programmed in the use of the device resulting from the idea of the invention. The idea resulting from the invention can in fact be used with considerable advantages for heart diseases such as angina pectoris, stable angina, unstable angina, myocardial infarction as well as arrhythmias, hypertensive heart disease, ischemia, myocarditis, pericarditis and myxoma.

In myocardial infarction, the pain perceived by the patient is of the same nature as angina but lasts more than 15 minutes, it is not aggravated by movement, it is not relieved by resting or by taking glycerin trinitrate. In the most serious cases, the heart attack can become complicated up to cardiovascular collapse and death. We speak of acute myocardial infarction due to the rupture of atherosclerotic plaque and the formation of a thrombus rich in platelets and fibrin which leads to the immediate total occlusion of a coronary artery. Consequently, necrosis or death of myocardial muscle tissue occurs, first supplied by the blocked artery. The location and extent of the infarction depend on the occluded artery and whether or not there is a collateral blood supply: if the area supplied by the artery in question has an adequate supply of blood from adjacent arteries, the coronary occlusion may not even induce myocardial infarction. The expansion of the infarction that follows in the days following the attack, with the thinning of the muscle tissue, has an adverse effect on the configuration and contractility of the left ventricle, and is an important component subsequent heart failure (complication).

Faced with this pathology, the medical device will be able to predict its occurrence very early, thanks to the detection of the many mass and electrical variables connected to it; the stimulator electrodes and the sensor electrodes will keep the heart always in activity, facilitating blood perfusion; biochemical, infrared and thermal sensors will help prevent the onset of the disease in advance.

Intervention procedure using the device resulting from the idea of the invention:
Device switching on via remote control on web or mobile interface.
Activation of bidirectional communication in and out to the Network.
Electric circuit activation of the variable geometry sensor/electrode groups.
Connection with dedicated servers via encrypted communication.
Connection to the management software.
Beginning of data collection and analysis using AI algorithms.
Construction of the vectorcardiogram and real-time analysis indices of the electrical waves of the heart and the general health picture of the organ in question.
The control logic enables within each sensor/electrode group the single sensor or electrode that provides the best performance for the purpose of reducing artifacts in the vectorcardiogram.
Start of cardiac cycle detection.
Myocardial cells allow for depolarization and repolarization deflections.
Activation of monitoring electrodes. Depolarization of the sinoatrial node.
The device detects an atherosclerotic anomaly.
Detection by infrared and photonic sensors of an atherosclerotic plaque occlusion.
Body temperature detected by thermistors.
Analysis of hemoglobin values, chemical sensors and biosensors.
Evaluation by the AI algorithm.
Activations of the healing electrodes with electric discharge.
Electrical impulse from the heart leaves the sinoatrial node.
Detection of monitoring electrodes.
Activations of the electrodes of the heart with electric discharge.
Radial propagation of electrical impulse of the heart up to the atrial dome.

Activation of monitoring electrodes.

Activation of the electrodes of the heart with electric charge.

Discharges reach the designated location and keep myocardial tissue elastic. The discharges are arranged on the atrial sinus keeping the heart at its minimum electrical potential at 1.4 Hz. The discharges have this cadence to keep the heart at 84 bpm (beats per minute). The further stimulating electrodes present in the groups positioned near the Purkinje fibers, maintain the membrane potential of the various cell types on1 −60 mV and −70 mV. The driving of these electrodes is governed by an execution pattern that slavishly respects the propagation of the normal electrical discharge within the aforementioned of areas the heart, also maintaining the different potentials calibrated on the previously mentioned values thus replicating externally the electrical stimulation that occurs inside the heart, natural stimulation absent in the event of cardiovascular collapse, thus keeping the patient alive and the heart muscle in the best possible physiological condition. The alternation of Systole (muscle contraction) and Diastole (muscle relaxation) determines the continuation of the blood supply to the heart.

Final data collection.

Software analysis of the detected parameters. Definition of the result on vectorcardiogram.

Response out of the ordinary: an alarm is generated to authorized hospitals and to the competent interfaces and users. Collection of data in the "myocardial infarction" detection scheme for the AI algorithms aimed at autonomous learning of the event for its decision-making independence.

Response in the standard: archiving of event data and data collection in the "angina pectoris" detection scheme for AI algorithms aimed at autonomous learning of the event for its decision-making independence.

Sending reports to the qualified doctor for the creation of countermeasures to be taken with preventive treatments (food, physical exercises) or through any drug treatments or hospitalizations.

Sending reports to patients or authorized users on to be taken with preventive treatments (food, physical exercises) or through any drug treatments or hospitalizations.

Update of the entire operating platform with new operational strategies derived from learning the AI of recorded events.

Download of the new code on the wearable device resulting from the idea of the invention.

Advantages of the Invention

The advantages that can be obtained from using the device resulting from the idea of the invention are briefly listed:

1. The wearable stand is practical and easy to put on; is equipped with elements designed to stabilize the position of the innovative variable geometry sensor/electrode groups on the human body, even when the patient performs physical activity or simple walking.
2. The individual sensors and electrodes known in the state of the art are modified in their construction in the form of a grouping of these elements in a single device called "sensor/electrode group" equipped with a variable geometry. These elements are designed to prevent the generation of artifacts in the vectorcardiogram due to body movement during patient walking, or other physical activity. Each sensor/electrode group is configured and enabled by the control logic unit.
3. The groups of sensors/electrodes with variable geometry can be made within of Artificial Lipid Membranes to improve the electrical performance of transduction towards the cells of the human body.
4. The wearable device resulting from the idea of the invention operates both in monitor mode, i.e. records the events of cardiac activity, and in active mode, i.e. acting through the perfusion of electrical stimuli to the heart muscle, in order to establish first intervention procedures also aimed at safeguarding life of the patient.
5. The wearable device resulting from the idea of the invention is equipped with an AI layer capable of operating also in local mode (ie when not connected to the network) in order to ensure a minimum decision-making capacity pre-established.
6. The wearable device resulting from the idea of the invention is equipped with one or more microphones designed to record sound events that can be associated with functions with voice command and emergency events of pathologies attributable to the field intervention of the same device.
7. The wearable device resulting from the idea of the invention can be managed remotely while connected to the network and is updated on new operational architectures resulting from predictors of AI.
8. The wearable device resulting from the idea of the invention during connection to the network allows optimized management of the health system resources, automatically activating intervention procedures for operators, generating reports, alerting hospital departments and/or authorized structures, finding medicines and real-time sharing of data and patient management strategies.

REFERENCE DOCUMENTS

US2019298987A1.

Khan, G. M. (2015). "A new electrode placement method for obtaining 12lead ECGs. OpenHeart, 2 (1), e000226

"An artificial intelligence-enabled ECG algorithm for the identification of patients with atrial fibrillation during sinus rhythm: a retrospective analysis of outcome prediction" Zachi I Attia Et al, Volume 394, Issuv 10201, P 861-867, Published Aug. 1, 2019 on The Lancet.

XILINX ACAP, White Paper: Versal ACAP

I claim:

1. A wearable device for detecting human body biometric data, the wearable device comprising:
   a shirt formed from a breathable material and configured to cover a human body from a base of a neck to a groin area and comprises:
   a zip being configured to open said shirt;
   an electrical switch within said zip;
   stiffening areas formed from layered materials and configured to be positioned on a precordial region, peripheral to said precordial area on a lower abdomen and forearm of the human body; and
   an area configured to case one or more batteries;
   a plurality of support members, six of the plurality of support members anchored to one of the stiffening areas configured to be positioned on the precordial region, two of the plurality of support members anchored to one of the stiffening areas configured to be positioned peripheral to said precordial area on the lower abdomen and an additional two of the plurality of support members anchored to the stiffening areas configured to be positioned peripheral to said precordial area on forearms of the human body; and a plurality of electrodes;
  wherein each of the plurality of support members comprises:
    three cross-shaped holes spaced apart along its respective support member; and
    three electrodes of the plurality of electrodes, wherein two of the three electrodes are configured for electrical heart monitoring and one of the three electrodes are configured for electrical shock;
  wherein each of the three electrodes is configured to be received by a center of a respective cross-shaped hole and slidable within the respective cross-shaped hole to adjust its position relative to the rest of the three electrodes on the respective support member to reduce signal artifacts;
  wherein the three electrodes are embedded in an artificial lipid membrane such that the artificial lipid membrane is interposed between the respective support member and a surface of the epidermis of the wearer;
  wherein said electronic management circuits are comprised of insulated conductors, being integrated in said shirt and being in electrical connection with said three electrodes, said electrical switch and said one or more batteries; and
  wherein said electronic management circuits are further configured to connect to a microphone cased in said shirt.

2. The wearable device of claim 1, further comprising: another support member comprising at least one heart rate variability sensor.

3. The wearable device of claim 1, wherein said electronic management circuits comprise:
  a central processing unit (CPU) integrated by at least one of a group consisting of a complex programmable logic device (CPLD), a field programmable gate array (FPGA), a digital signal processor (DSP) and a graphic processor unit (GPU);
  a bidirectional wireless communication interface for at least one of a group consisting of a wireless local network (WLAN), a radio communication protocol, and a cellular network;
  a bidirectional communication interface of a universal serial bus (USB) type;
  a bidirectional communication interface wired to the two of the three plurality of ECG electrodes, the heart rate variability sensor and the one of the three electrodes;
  an analogic electrical input port of a balanced differential type;
  a digital electrical input port of a balanced differential type;
  a non-removable memory storage unit;
  a removable memory storage unit;
  an electrical batteries element;
  a circuit for recharging said one or more batteries by power grid;
  a circuit for recharging said one or more batteries by inductive coupling or by conversion of kinetic energy or both; and
  a sensors group comprises a global positioning system (GPS) position detector, a magnetometer and an accelerometer.

4. The wearable device of claim 1, further comprising a software and a firmware oriented to management of architectures of a set of machine learning techniques comprising at least one of a group consisting of: deep learning, neural network, support vector machines, classifications and regression tree, supervised learning, unsupervised learning, reinforced learning, multi-task learning and relation learning, bio-inspired approaches, latent representation, probabilistic graphical models, rule learning, and instance-based learning.

5. A method for monitoring a heart muscle, the method comprising the steps of:
  I. turning on a wearable device, according to claim 1, by remote control;
  II. activating said electronic management circuits and said plurality of electrodes so as to activate bidirectional communication on a network and software/firmware update through said network;
  III. starting patient data collection via a first group of electrodes being the two of the three electrodes on each of the plurality of support member configured for monitoring the heart muscle and analyzing the patient data collection using artificial intelligence algorithms;
  IV. Generating a vectorcardiogram and real-time analysis of electrical waves corresponding to the heart muscle;
  V. electrically scanning the first group of electrodes configured for monitoring the heart muscle and selecting an electrode from the first group of electrodes with a desired signal to noise ratio and a lower vectorcardiogram artifacts with a control logic through said electronic management circuits;
  VI. determining and sharing acquired data of functioning status of the heart muscle on said network;
  VII. evaluating the shared acquired data with artificial intelligence algorithms on said network through said electronic management circuits;
  VIII. monitoring activity of the heart muscle with the first group of electrodes and supplementing with a perfusion of electrical stimulation with a second group of electrodes being the third of the three electrodes on each of the plurality of support member configured for stimulation so as to reveal an anomaly of a cardiac state of the heart muscle;
  IX. generating an additional vectorcardiogram as a response to said perfusion of said electrical stimulation;
  X. generating an alarm to an authorized hospital and interfaces of enabled users through said network when the response to said perfusion of said electrical stimulation is out of norm;
  XI. storing said response as said recorded event data when the response to said perfusion is in the norm; and
  XII. updating said wearable device with operating strategies derived from artificial intelligence learning from said recorded event data.

6. The method for monitoring the heart muscle, according to claim 5, step of supplementing with the perfusion of electrical stimulation comprises driving said second group of electrodes configured for stimulation to maintain the heart muscle at its minimum electrical potential at 1.4 KHz, a heartbeat at 84 bpm and a membrane electrical potential of all cellular typology at −60 mV and −70 mV.

* * * * *